United States Patent
Vitel et al.

(10) Patent No.: US 7,699,355 B2
(45) Date of Patent: Apr. 20, 2010

(54) VARIABLE-ANGLE TUBULAR CONNECTION

(75) Inventors: Jean-Pierre Vitel, Thiaucourt-Regnieville (FR); Daniel Grojean, Bouvron (FR); Philippe Renard, Fleville (FR)

(73) Assignee: Saint-Gobain Pam, Nancy (FR)

( * ) Notice: Subject to any disclaimer, the term of this patent is extended or adjusted under 35 U.S.C. 154(b) by 164 days.

(21) Appl. No.: 11/911,567

(22) PCT Filed: Apr. 13, 2006

(86) PCT No.: PCT/FR2006/000815

§ 371 (c)(1),
(2), (4) Date: Oct. 15, 2007

(87) PCT Pub. No.: WO2006/111638

PCT Pub. Date: Oct. 26, 2006

(65) Prior Publication Data

US 2008/0179880 A1    Jul. 31, 2008

(30) Foreign Application Priority Data

Apr. 18, 2005  (FR) .................................. 05 03856

(51) Int. Cl.
F16L 27/00    (2006.01)
F16L 43/00    (2006.01)

(52) U.S. Cl. .................. 285/184; 285/148.28; 285/179; 285/181

(58) Field of Classification Search ............ 285/148.28, 285/179, 181, 184, 368
See application file for complete search history.

(56) References Cited

U.S. PATENT DOCUMENTS

| 826,931 | A | * | 7/1906 | Gordon | 285/181 |
|---|---|---|---|---|---|
| 960,899 | A | * | 6/1910 | Guyer | 285/181 |
| 1,020,839 | A | * | 3/1912 | Niesen | 285/184 |
| 1,605,507 | A | * | 11/1926 | Burke | 285/98 |
| 1,880,098 | A | * | 9/1932 | Mair | 285/184 |
| RE19,132 | E | * | 4/1934 | McGuirk | 285/181 |
| 1,966,039 | A | * | 7/1934 | Muchnic | 285/135.5 |
| 2,009,650 | A | * | 7/1935 | Claussen et al. | 285/302 |
| 2,124,474 | A | * | 7/1938 | Scholtes | 285/65 |
| 2,178,240 | A | * | 10/1939 | Pascale | 55/301 |

(Continued)

FOREIGN PATENT DOCUMENTS

| AU | 4896369 | 7/1970 |
|---|---|---|
| DE | 358329 | 9/1922 |
| FR | 1 469 425 | 2/1967 |
| FR | 2 830 070 | 3/2003 |
| GB | 2 161 234 | 1/1986 |
| WO | WO 99/22172 | 5/1999 |

*Primary Examiner*—James M Hewitt
(74) *Attorney, Agent, or Firm*—Sughrue Mion, PLLC

(57) ABSTRACT

This variable-angle tubular connection includes a first tubular section (4) which has a flange ring (10), a second tubular section (6) which has an end flange (12) and a clamping device (8) for clamping the flange ring (10) against the end flange (12). The clamping device (8) has at least one linking segment (22), suitable for being applied against the flange ring (10), and components (24) for clamping the linking segment (22) against the flange ring. The end flange (12) has traversing recesses (20) through which the clamping components extend. The end flange is fixed to the second tubular section (6). Application to the sealed junction of tubing elements.

19 Claims, 7 Drawing Sheets

U.S. PATENT DOCUMENTS

| | | | | |
|---|---|---|---|---|
| 2,342,120 A | * | 2/1944 | Cartwright | 239/125 |
| 3,387,867 A | * | 6/1968 | Rogers | 285/336 |
| 4,023,833 A | * | 5/1977 | Wellard | 285/179 |
| 4,484,771 A | * | 11/1984 | Schulz | 285/368 |
| 4,702,274 A | * | 10/1987 | Kramer | 137/515.5 |
| 5,437,482 A | * | 8/1995 | Curtis | 285/148.13 |
| 6,114,631 A | * | 9/2000 | Gretz | 174/651 |
| 6,932,390 B1 | * | 8/2005 | Gretz | 285/184 |

\* cited by examiner

VARIABLE-ANGLE TUBULAR CONNECTION

This is a U.S. National Stage Application of Application No. PCT/FR2006/000815 filed Apr. 13, 2006, claiming priority to FR 05 03856, filed Apr. 18, 2005, each of which is incorporated within by reference in its entirety.

BACKGROUND OF THE INVENTION

The present invention relates to a variable-angle tubular connection, of the type comprising:
- a first tubular section which defines a first central axis and which comprises a flange ring oblique to the first central axis,
- a second tubular section which defines a second central axis and which comprises an end flange oblique to the second central axis,
- the flange ring and end flange forming an axis of rotation, and
- means for clamping the flange ring against the end flange which are suitable to allow a relative rotation of the flange ring and the end flange of 360° about the axis of rotation.

A variable-angle tubular junction of the aforementioned type is known from document AU-A-4896369.

A variable-angle tubular connection comprising a first tubular section and a second tubular section, each of which comprises a terminal flange ring is also known from document FR-A-1,469,425. The tubular connection also comprises two sliding flanges, which are separate parts from the flange rings, and are suitable for clamping the flange rings against each other by means of bolts. This connection comprises a large number of constituent parts, and, consequently, is difficult to manufacture and costly to assemble.

SUMMARY OF THE INVENTION

The aim of the invention is to provide a variable-angle tubular connection which is economical to manufacture, easy to assemble and which will provide a reliable seal while allowing continuous angular variation and various connection possibilities at the free ends of the connection.

Accordingly, the invention relates to a tubular connection of the aforementioned type, characterised in that at least one of the tubular sections comprises a free end equipped with at least a first series of pins projecting radially outwards in relation to the central axis of this tubular section, said tubular section comprising a removable flange which is equipped with a passage recess for each of the pins in the first series of pins and which is designed for the assembly of the connection with an adjacent tubing element by a mechanical-type junction or by a flange junction, and in that, said removable flange can pivot in an angular range delimited by two first successive pins.

According to particular embodiments, the tubular connection according to the invention may comprise one or a plurality of the following characteristics:
- each recess is designed to receive a linking component, for assembling the removable flange with a detachable mating flange or with a flange on the adjacent tubing element;
- the linking component is a bolt.
- the free end also comprises a second end stop arranged between the first series of pins and the flange ring or the end flange, in particular a second series of pins aligned circumferentially with the pins of the first series of pins;
- the tubular connection comprises an aligned configuration in which the first and second axes are coaxial and an elbowed configuration in which the first and second axes intersect;
- the clamping means comprise at least one linking segment suitable for being applied against a surface of the flange ring facing away from the end flange and at least one clamping component, in particular a screw, suitable for clamping the or each linking segment against the flange ring, the end flange comprising traversing orifices, through which the clamping components extend, and the end flange being fixed to the second tubular section, and in particular being integral with the second tubular section, and the or each clamping component being radially located entirely outside the flange ring in relation to the axis of rotation;
- the end flange is polygon-shaped, in particular hexagonal;
- the or each linking segment has the shape of a part polygon complementary to the polygonal shape of the end flange;
- the or each linking segment has a thickness greater than the thickness of the wall of the end flange;
- the end flange comprises a skirt surrounding, at least partially, the clamping means and the flange ring;
- the tubular connection comprises display means suitable for indicating the relative position between the first and second central axes;
- the display means are formed by a scale, which is fixed in relation to the second tubular section and an indicator component fixed to the first tubular section;
- the tubular section comprises a gasket arranged between the first tubular section and the second tubular section, and it comprises a first end stop suitable for limiting compression of the gasket;
- the first tubular section comprises a guide rib coaxial to the first central axis, and the second tubular section comprises a shoulder complementary to the guide rib and receiving said guide rib; and
- the tubular section comprises a grasping handle and the end flange comprises a rectilinear edge which is situated, radially in relation to the second central axis, opposite the grasping handle.

BRIEF DESCRIPTION OF THE DRAWINGS

The invention will be better understood on reading the description that follows, given solely as an example, and produced with reference to the accompanying drawings, in which.

DETAILED DESCRIPTION OF THE INVENTION

Figure 1:
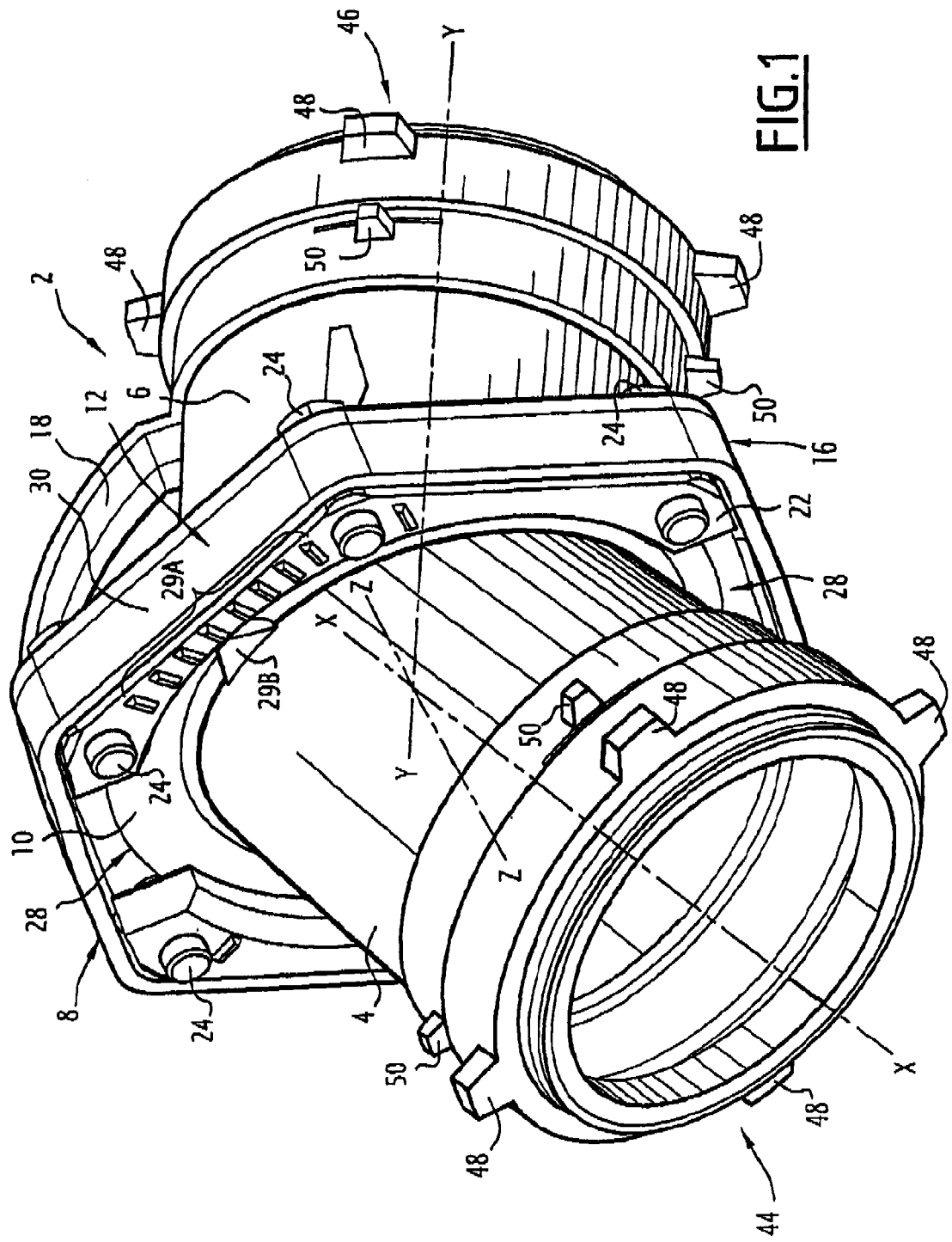
FIG. 1 is a perspective view of a variable-angle tubular connection according to the invention, in an elbowed configuration.

FIG. 1 illustrates a variable-angle tubular connection according to the invention, designated by the general reference numeral 2.

The tubular connection 2 comprises a first tubular section which is a male section 4, a second tubular section which is a female section 6, and clamping means 8 suitable for tightening the first section 4 against the second section 6. The tubular section 4 and 6 are produced in a rigid material, in particular in cast iron.

The first tubular section 4 defines a first central axis X-X and comprises a circular flange ring 10 which is oblique in relation to the central axis X-X forming an angle of 22.5° with this axis. The second tubular section 6 defines a second central axis Y-Y and comprises an end flange 12 which is oblique in relation to the central axis Y-Y forming an angle of 22.5° with this axis. The end flange 12 is fixed to the second tubular section 6 and in particular is integral with the tubular section 6. As can be seen in FIG. 1, the end flange 12 is polygon-shaped, in this case hexagonal, forming a rectilinear edge 16.

The flange ring 10 and the end flange 12 are held against each other and together form an axis of rotation Z-Z. The tubular section 4 and the tubular section 6 can be turned in relation to each other without restriction about the axis of rotation Z-Z, thus modifying the angle of inclination of the axes X-X and Y-Y in relation to each other between relative angles of between 0° and 45°, and allowing any angular position within this range to be attained.

The tubular section 6 also comprises a grasping handle 18 which is fixed on the one hand to the end flange 12, and on the other hand to the current portion of the second tubular section 6. The grasping handle 18 is situated on the side opposite the rectilinear edge 16, such that, when the tubular connection 2 is placed on the ground, the handle 18 extends upwards. This makes it easier to grasp the connection 2.

Moreover, traversing orifices 20 are arranged in the end flange 12 and extend parallel to the axis of rotation Z-Z.

The clamping means 8 comprise two linking segments 22, produced in a rigid material, such as cast iron, and suitable for being applied against the surface of the flange ring 10 facing away from the end flange 12, and clamping screws 24, suitable for clamping the two linking segments 22 against the flange ring 10. It is also possible to envisage replacing the screws 24 by bolts, but it is then necessary to use two chuck keys.

The clamping screws 24 extend through the orifices 20 and are screwed in internal threads 26 of the linking segments 22. The clamping screws 24 are radially located entirely outside the flange ring 10 in relation to the axis of rotation Z-Z, thus allowing an unrestricted relative rotation of the flange ring 10 and the end flange 12 of 360° about the axis of rotation Z-Z.

Each linking segment 22 has the general form of a part polygon which is complementary to the polygonal form of the end flange 12. In addition, two interstices 28 remain between the two linking segments 22, thus saving material and contributing to reducing the weight of the tubular connection 2.

Figure 4:
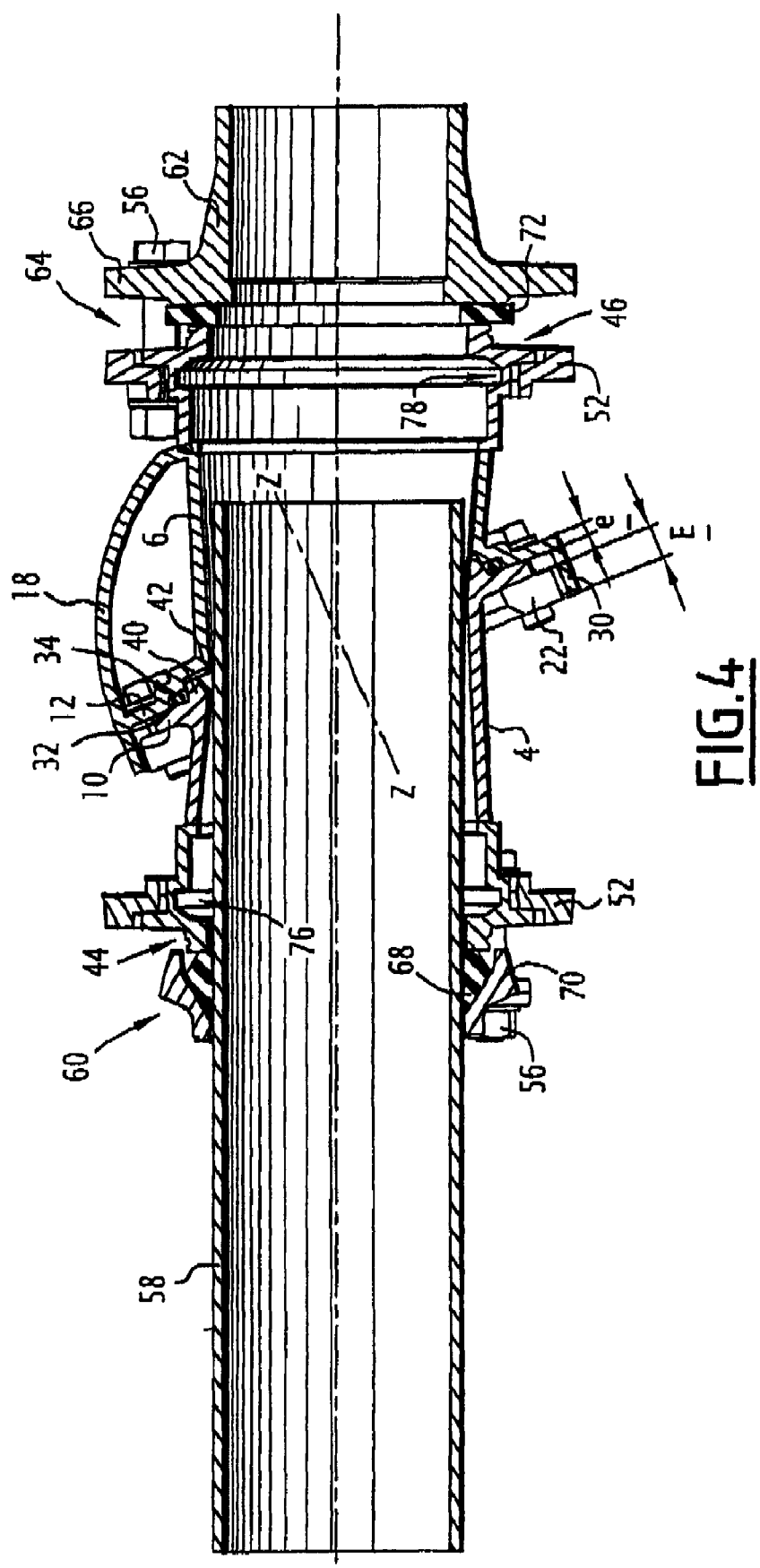
FIG. 4 is a longitudinal cross-section of FIG. 2.
Figure 5:
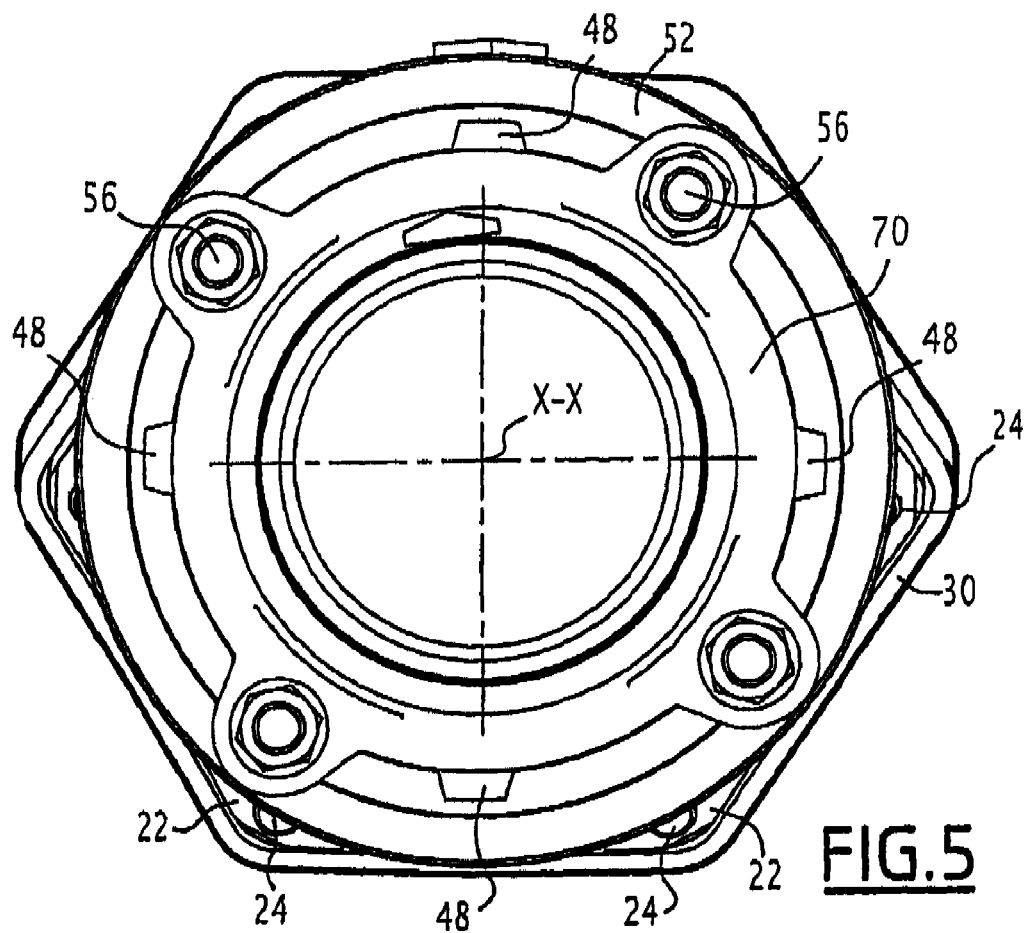
FIG. 5 shows the connection in FIG. 2 along the central axis of the male section.

Referring more particularly to FIG. 4, it can be seen that the linking segments 22 have a thickness E, measured in the direction of the axis of rotation Z-Z, which is greater than a thickness e, measured along the axis of rotation Z-Z, of the end flange 12. These characteristics lead to significant rigidity of the link while limiting the weight of the connection.

Advantageously, the linking segments 22 have a graduation or scale 29A in the region of the male section 4 which, in combination with the fixed mark 29B integral with the male section 4 allows precise angular adjustment.

In addition, the end flange 12 comprises a hexagonal skirt 30 which surrounds the linking segments 22 and the flange ring 10. The skirt 30 covers axially at least in part the linking segments 22 and the flange ring 10, thus serving as an end stop to the segments 22. Moreover, this skirt 30 protects the linking segments 22 and the flange ring 10 from specks of dirt and stiffens the end flange 12.

Figure 3:
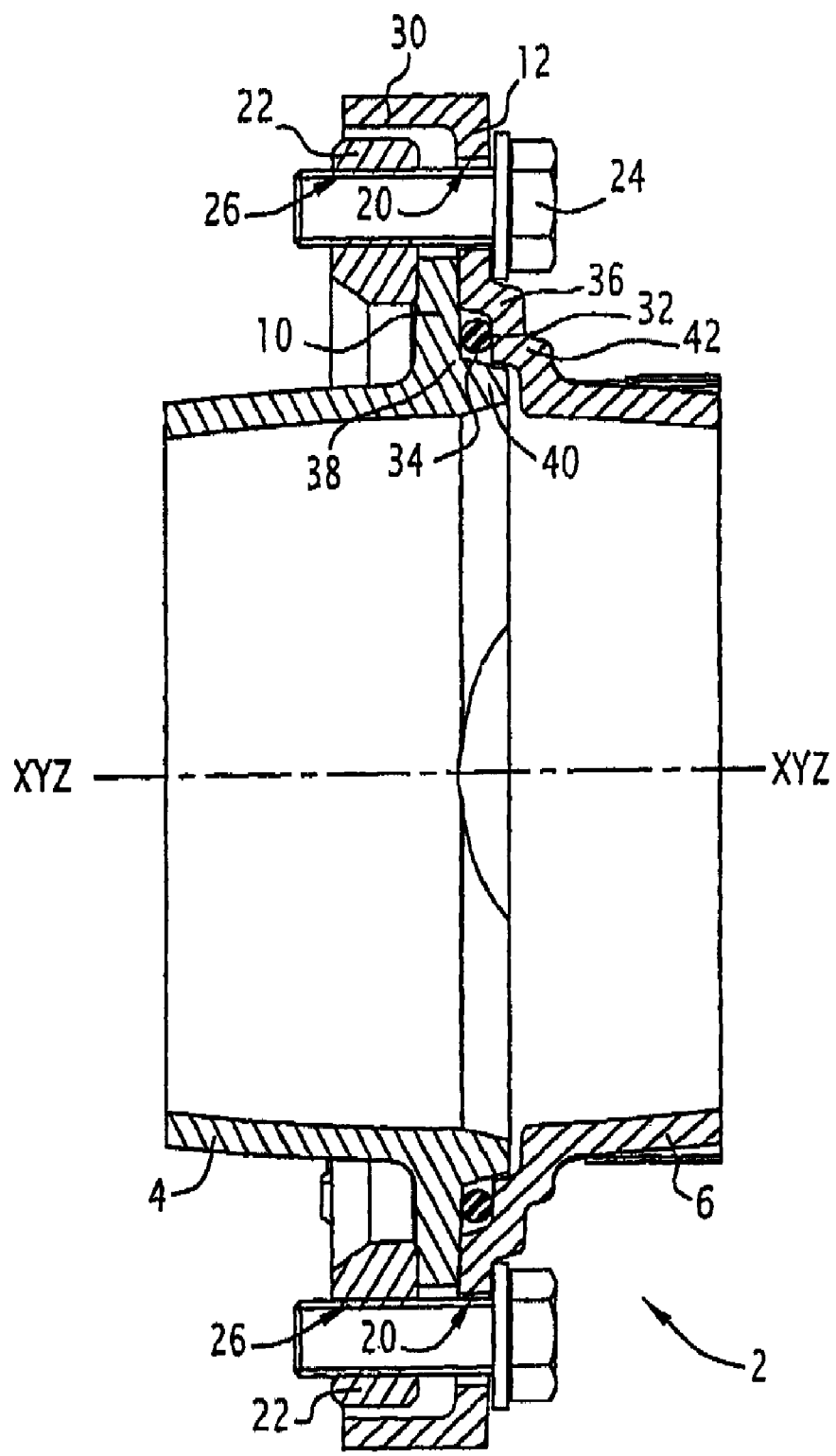
FIG. 3 is a view in cross-section along the line III-III of FIG. 2.

As can be seen in FIG. 3, the variable-angle connection 2 also comprises a toric gasket 32 produced in elastomer material, and arranged between the end flange 12 and the flange ring 10 (see FIGS. 3 and 4). The gasket 32 is trapped in a housing 34 delimited by a first inner shoulder 36 of the end flange 12 and by an outer shoulder 38 which connects the flange ring 10 to the end portion 40 of the male section 4, thus preventing any risk of the gasket 32 being expelled.

The housing 34 in which the gasket 32 is enclosed also allows the compression of the elastomer of the gasket 32 to be controlled because of the metallic contact at the end of clamping between the flange ring 10 of the male section 4 and the radial face opposite the end flange 12 of the female section 6, thus avoiding any risk of damage to the gasket 32 that could result from excessive compression of the elastomer. The flange ring 10 and the end flange 12 thus form an end stop which limits compression of the gasket 32 and thus ensures that it is not damaged.

The positioning of the gasket 32 also gives it an autoclave effect, the seal increasing with the pressure of the fluid circulating inside the connection.

Moreover, the linking end of the female section 6 also has a second inner shoulder 42 farther inside radially than the one for receiving the toric gasket 32, this second shoulder 42 serving as a housing for the adjacent end portion 40 of the male section 4 so as to guide the male section 4 in rotation around the female section 6.

The connection according to the invention is of the universal type since for each of the free ends 44, 46 of the sections 4, 6, there are different junction possibilities with the adjacent tubing elements. Each free end 44, 46 is therefore suitable to allow a choice of:

a flange junction, for sealed assembly with a tubing element equipped with a terminal flange such as a gate valve for example;

or a mechanical junction by detachable mating flange, for sealed, and if necessary locked, assembly with a smooth- or plain-ended tubing element such as a pipe, for example;

or an automatic junction, for sealed, and if necessary locked, assembly with a smooth- or plain-ended tubing element such as a pipe, for example.

More precisely, the free end 44, 46 of each section 4, 6 has two series of pins projecting radially outwards for mounting a removable flange. In this particular case, the first series comprises four first pins 48 and the second series comprises four second pins 50, axially offset from the first pins towards the flange ring 10 and towards the flange 12 but aligned circumferentially with the first pins 48 (see FIG. 1).

Figure 6:
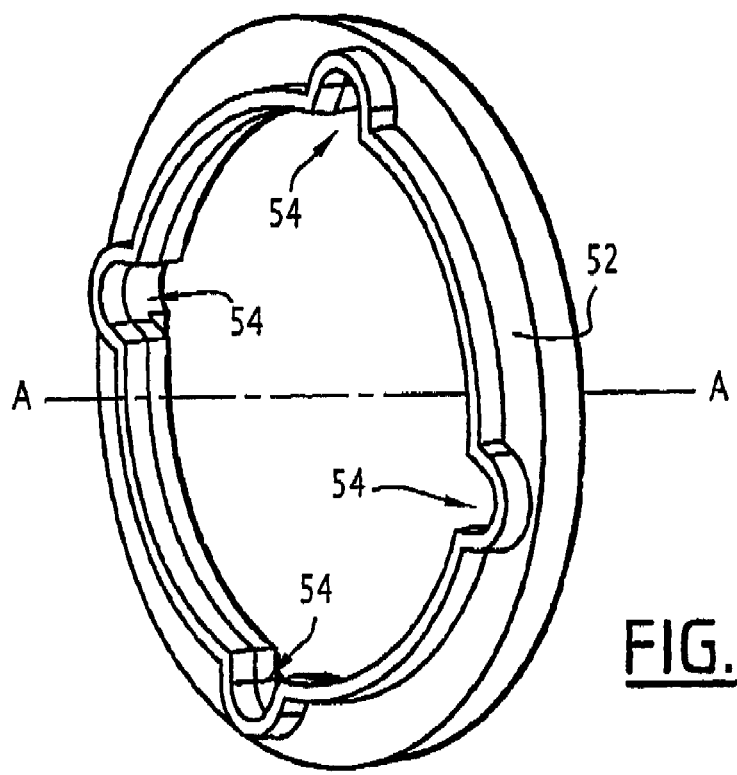
FIG. 6 is a perspective view of an assembly flange suitable to be used with the tubular connection according to the invention.
Figure 7:
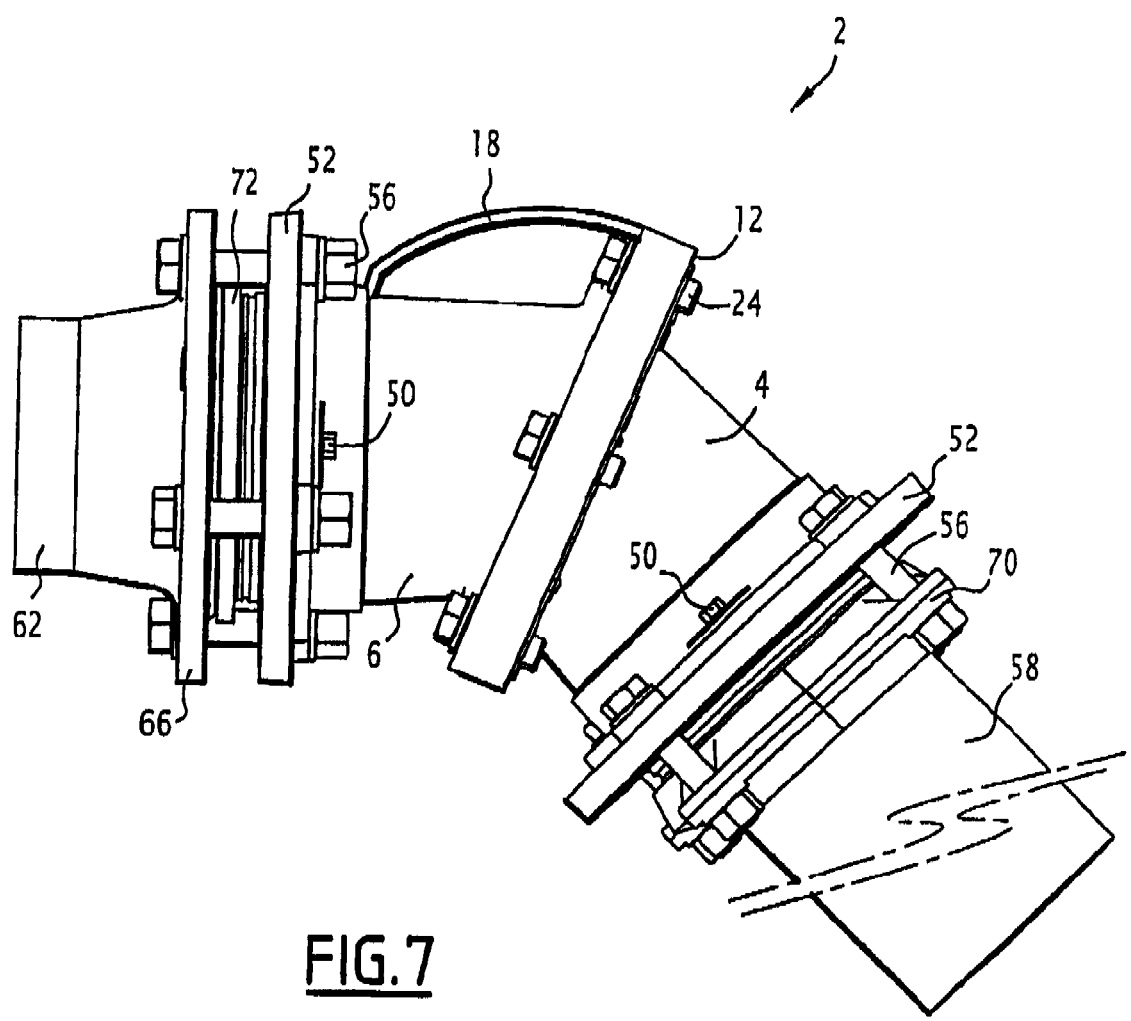
FIG. 7 is a side view of a tubular connection in the assembled state, in an elbowed configuration.
Figure 8:
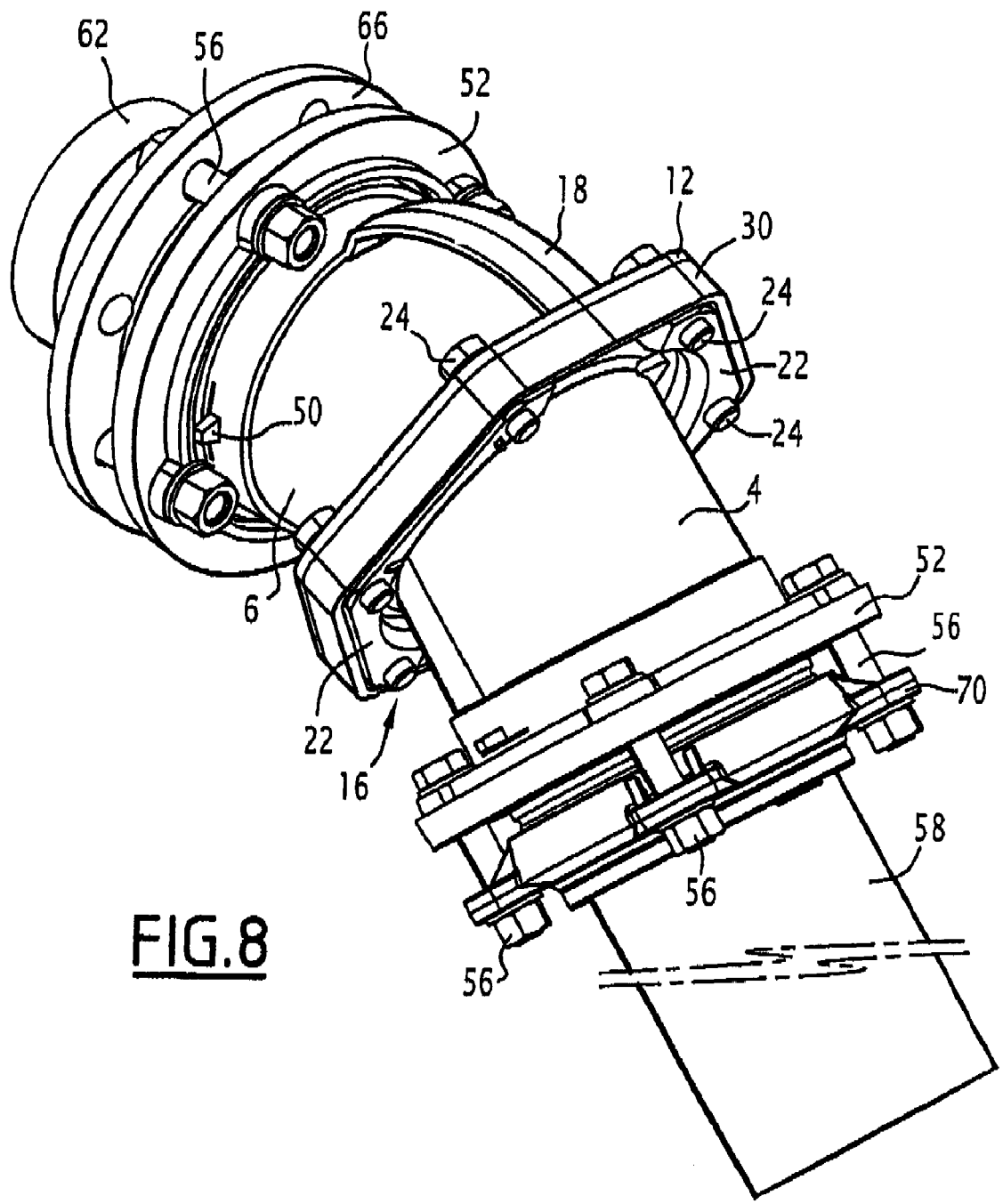
FIG. 8 is a perspective view of the unit in FIG. 7.

An annular removable flange 52 (FIG. 6) produced in a rigid material, for example in cast iron, is equipped with four recesses 54 open radially inwards in relation to its own central axis A-A. These recesses 54 are suitable for being traversed by the first four pins 48, for bayonet-type assembly, and to then receive bolts 56 for assembling the removable flange 52 with a fixed or removable flange (flange junction) or with a movable mating flange (mechanical junction) of an adjacent tubing element. Assembly is carried out as follows. After having been traversed by the first four pins 48, the removable flange 52 is pivoted about the axis A-A until the recesses 54 no longer coincide with the first four pins 48, the second pins 50 forming an axial end stop and thus holding the flange 52 in place in this offset position, preventing it from sliding towards the central portion of the connection 2. Finally, the bolts 56 are introduced through the recesses 54 of the removable flange 52 so as to make said removable flange integral with the free end 44 or 46 of the connection.

The removable flange 52 can therefore no longer be disassembled as long as the bolts 56 are in place in the recesses 54.

Figure 2:
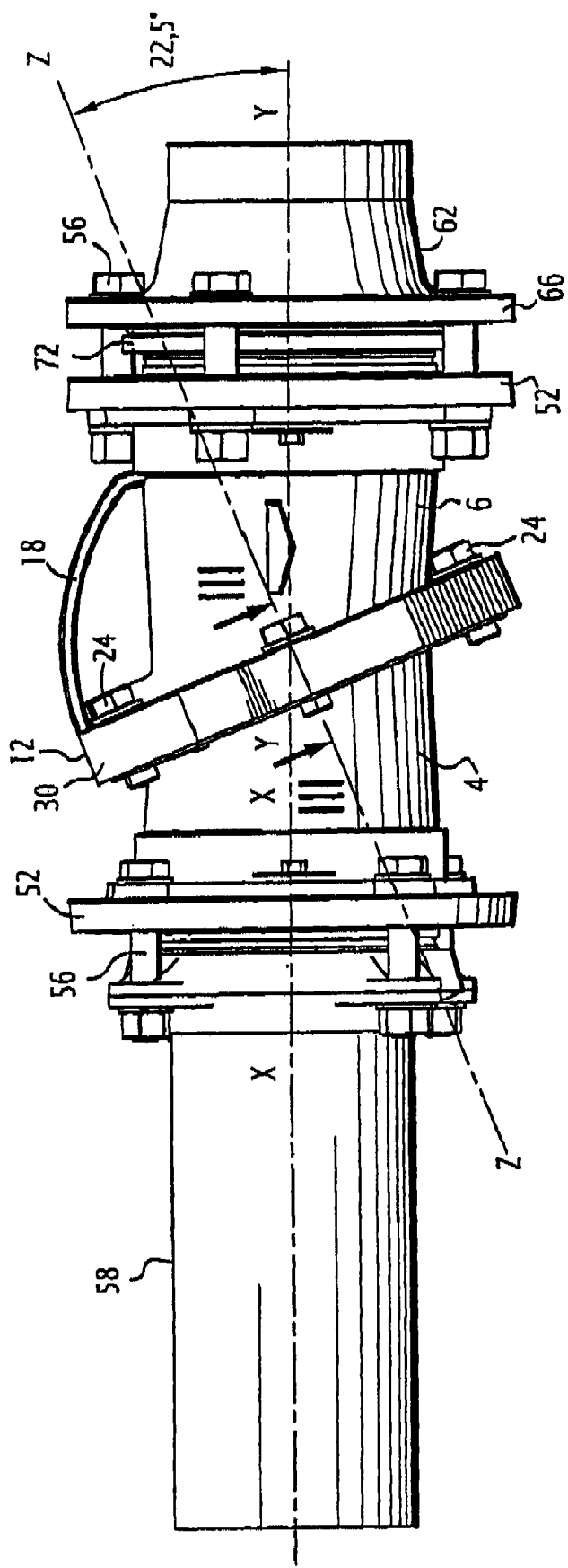
FIG. 2 is a side view of the tubular connection according to the invention, in an aligned configuration, assembled to adjacent tubing elements.

FIGS. 2 and 4 show an embodiment in which the connection 2 is in the aligned configuration, such that the axes X-X, Y-Y of the two sections 4, 6 are coaxial. The free end 44 of the section 4 is connected to the plain end of a tubing element 58 by a mechanical junction 60. The free end 46 of the section 6 is connected to a tubing element 62 by a flange junction 64. The element 62, such as a gate valve or a flange connection, is only illustrated in part in FIG. 2, and is equipped with a fixed assembly flange 66.

In the case of the mechanical junction 60 in FIG. 4, the seal is obtained by means of a gasket 68 made of compressed elastomer between the outer surface of the plain end of the element 58, the portion of the end 44 of the connection 2 and the truncated inner surface of a mating flange 70 produced in a rigid material, in particular in cast iron, surrounding the plain end of the element 58. The mating flange 70 is connected to the removable flange 52 of the connection 2 by means of bolts 56 which are tightened to bring the mating flange 70 of the connection 2 closer axially, and thus compress the gasket 68.

In the case of a flange junction 64, a flat sealing ring 72 made of elastomer is placed between the portion of the end 46 of the connection 2 and the fixed assembly flange 66 integral with the tubing element 62 to be assembled, and the assembly is sealed by axial compression of this ring 72 while tightening the bolts 56 which connect the fixed assembly flange 66 of the tubing element 62 to the removable flange 52 of the connection 2.

In the view in cross-section in FIG. 4, inner grooves 76, 78 can also be seen, at both ends 44, 46 of the connection 2, said grooves being designed to receive a gasket, which is not illustrated, equipped if necessary with locking inserts, to achieve an automatic junction.

The introduction of the plain end of the element 58 in the end 44 of the connection 2 equipped with such a gasket then causes radial compression of the elastomer, thus sealing the junction. If, in addition to a seal, it is required to lock the automatic junction, the conventional gasket need only be replaced by a gasket provided with locking inserts embedded in the elastomer and toothed internally, such a gasket being known per se (see for example EP 526 373); by biting into the outer surface of the plain end, the metal inserts prevent separation of the plain end and the connection under the action of axial forces tending to disconnect these two elements.

In a variant, if locking the mechanical junction is required, the gasket need only be replaced by a gasket equipped with metal locking inserts designed to bite into the outer surface of the plain end. Advantageously, the mating flange 70 encompassing the gasket may be ready-mounted on the connection, thus obtaining a "ready-to-fit" device; it will then only be necessary to insert the plain-ended end into the connection on site, then carry out the final tightening of the bolts to seal the junction, thus greatly facilitating fitting of the connection.

In a variant, one of the removable flanges 52 of the connection 2 may be replaced by a fixed flange integral with one of the free ends 44, 46 of the connection, allowing mechanical junctions, which may or may not be locked, to be produced as well as flange junctions. However, the removable flange solution is advantageous since it offers the possibility, by pivoting the removable flange in an angular range delimited by two first successive pins, of aligning the position of the orifices of the removable flange with those of the adjacent end flange of a tubing element that requires precise positioning in the ground, such as a gate valve the handling rod of which must be substantially vertical, thus allowing fine adjustment of the position of the connection in relation to the position of the adjacent tubing element.

In this particular case, in the embodiment described, the first pins 48 are spaced by about 80° and the removable flange 52 may consequently rotate by about 80° about its central axis A-A, thus allowing the recesses 54 of the removable flange 52 to be made to coincide with the bolt passage holes arranged in the fixed flange integral with the end of an adjacent tubing element.

Therefore, in addition to the freedom of rotation over 360° of one tubular section 4, 6 in relation to the other offered by the central link between these two sections 4, 6, the fact that the removable flange 52 can pivot freely within a significant angular range around at least one of the free ends of the connection, further increases the assembly and adjustment possibilities of the connection with an adjacent tubing element that needs to be placed in a very precise position.

The invention claimed is:

1. Variable-angle tubular connection comprising:
   a first tubular section (4) which defines a first central axis (X-X) and which comprises a flange ring (10) oblique to the first central axis (X-X),
   a second tubular section (6) which defines a second central axis (Y-Y) and which comprises an end flange (12) oblique to the second central axis (Y-Y),
   the flange ring (10) and the end flange (12) forming an axis of rotation (Z-Z), and also
   clamping means (8) of the flange ring against the end flange (12) which are suitable for allowing a relative rotation of the flange ring (10) and the end flange (12) of 360° about the axis of rotation (Z-Z), characterised in that at least one of the tubular sections (4, 6) comprises a free end (44, 46) equipped with at least a first series of pins (48) projecting radially outwards in relation to the central axis of this tubular section, said tubular section (4, 6) comprising a removable flange (52) which is equipped with a passage recess (54) for each of the pins (48) of the first series of pins and which is designed for assembly of the connection (2) with an adjacent tubing element (58, 62) by a mechanical-type junction or by a flange junction, and in that said removable flange (52) can pivot within an angular range delimited by two first successive pins (48),
   wherein the passage recesses (54) are open radially inwards relative to an axis (A-A) of rotation of the flange (52), the passage recesses (54) being adapted to be traversed by the first series of pins (48).

2. Variable-angle tubular connection according to claim 1, characterised in that each recess (54) is designed to receive a linking component, for assembly of the removable flange (52) with a mating flange (70) or with a flange (66) of the adjacent tubing element (58, 62).

3. Connection according to claim 2, characterised in that the linking component is a bolt (56).

4. Variable-angle tubular connection according to claim 1, characterised in that the free end (44, 46) also comprises a second end stop arranged between the first series of pins (48) and the flange ring (10) or the end flange (12).

5. The variable-angle tubular connection according to claim 4, wherein said second end stop comprises a second series of pins (50) aligned circumferentially with the pins (48) of the first series of pins.

6. Variable-angle tubular connection according to claim 1, characterised in that the connection (2) comprises an aligned configuration in which the first (X-X) and second (Y-Y) axes are coaxial and an elbowed configuration in which the first (X-X) and second (Y-Y) axes intersect.

7. Variable-angle tubular connection according to claim 1, characterised in that the clamping means (8) comprise at least one linking segment (22) suitable for being applied against a surface of the flange ring (10) facing away from the end flange (12) and at least one clamping component suitable for clamping the or each linking segment (22) against the flange ring (10), the end flange (12) comprising traversing orifices (20), through which the clamping components (24) extend, the end flange (12) being fixed to the second tubular section (6), and the or each clamping component (24) being radially located entirely outside the flange ring in relation to the axis of rotation (Z-Z).

8. Variable-angle tubular connection according to claim 7, characterised in that the or each linking segment (22) has a thickness (E) which is greater than the thickness (e) of the wall of the end flange (12).

9. The variable-angle tubular connection according to claim 7, wherein said at least one clamping component is a screw (24), and wherein said end flange (12) is integral with said second tubular section (6).

10. Variable-angle tubular connection according to claim 7, characterised in that the end flange (12) has a polygonal form.

11. Variable-angle tubular connection according to claim 10, characterised in that the or each linking segment (22) has a polygonal form complementary to the polygonal form of the end flange (12).

12. The variable-angle tubular connection according to claim 10, wherein the polygonal form is hexagonal.

13. Variable-angle tubular connection according to claim 1, characterised in that the end flange (12) comprises a skirt (30) at least partially surrounding the clamping means (8) and the flange ring (10).

14. Variable-angle tubular connection according to claim 1, characterised in that the connection (2) comprises display means (29A, 29B) suitable for indicating the relative position between the first (X-X) and second (Y-Y) central axes.

15. Variable-angle tubular connection according to claim 14, characterised in that the display means are formed by a scale (29A) which is fixed in relation to the second tubular section (6) and an indicator component (29B) fixed to the first tubular section (4).

16. Variable-angle tubular connection according to claim 1, characterised in that the connection (2) comprises a gasket (32) arranged between the first tubular section (4) and the second tubular section (6), and in that the connection (2) comprises a first end stop suitable for limiting compression of the gasket (32).

17. Variable-angle tubular connection according to claim 1, characterised in that the first tubular section (4) comprises a guide rib (40) coaxial to the first central axis (X-X), and in that the second tubular section (6) comprises a shoulder (42) complementary to the guide rib (40) and receiving said guide rib.

18. Variable-angle tubular connection according to claim 1, characterised in that the connection (2) comprises a grasping handle (18), and in that the end flange (12) comprises a rectilinear edge (16) which is situated, radially in relation to the second central axis (Y-Y), opposite the grasping handle.

19. The variable-angle tubular connection according to claim 1, wherein the passage recesses (54) are traversed by the first series of pins (48) for bayonet-type assembly.

\* \* \* \* \*